(12) United States Patent
De Boer

(10) Patent No.: US 8,823,198 B2
(45) Date of Patent: Sep. 2, 2014

(54) OFFSHORE WIND PARK

(75) Inventor: Gerlof Johannes De Boer, Soest (NL)

(73) Assignee: XEMC Darwind B.V., Hilversum (NL)

( * ) Notice: Subject to any disclaimer, the term of this patent is extended or adjusted under 35 U.S.C. 154(b) by 136 days.

(21) Appl. No.: 13/202,137

(22) PCT Filed: Feb. 19, 2010

(86) PCT No.: PCT/EP2010/052152
§ 371 (c)(1),
(2), (4) Date: Oct. 18, 2011

(87) PCT Pub. No.: WO2010/094776
PCT Pub. Date: Aug. 26, 2010

(65) Prior Publication Data
US 2012/0043763 A1 Feb. 23, 2012

(30) Foreign Application Priority Data
Feb. 20, 2009 (EP) .................................... 09153330

(51) Int. Cl.
*F03D 9/00* (2006.01)

(52) U.S. Cl.
USPC .............................................. 290/55; 290/44

(58) Field of Classification Search
USPC ..................................... 290/44, 55
See application file for complete search history.

(56) References Cited

U.S. PATENT DOCUMENTS

| 7,075,189 B2 * | 7/2006 | Heronemus et al. ............. 290/44 |
| 7,086,809 B2 * | 8/2006 | Busso ........................... 405/203 |
| 7,281,881 B1 | 10/2007 | Cermelli |
| 7,471,006 B2 * | 12/2008 | Janca et al. ...................... 290/43 |
| 2001/0002757 A1 * | 6/2001 | Honda et al. .................... 290/55 |
| 2009/0162144 A1 * | 6/2009 | Ayre .............................. 405/76 |
| 2011/0037264 A1 * | 2/2011 | Roddier et al. ................. 290/44 |

FOREIGN PATENT DOCUMENTS

| DE | 19846796 A1 | 4/2000 |
| DE | 20109480 U1 | 10/2001 |
| NL | 1008318 C2 | 8/1999 |
| WO | WO 02073032 A1 | 9/2002 |

OTHER PUBLICATIONS

Zambrano T et al: "Dynamic modeling of deepwater offshore wind turbine structures in Gulf of Mexico storm conditions" 2006, Proceedings of the International Conference on Offshore Mechanics and Artic Engineering—OMAE—Proceedings of 25$^{th}$ International Conference on Offshore Mechanics and Artic Engineering, OMAE 2006, 2006 American Society of Mechanical Engineers US, V, XP002557080 figures 1,2.

(Continued)

*Primary Examiner* — Tho D Ta
(74) *Attorney, Agent, or Firm* — Steven M. Koehler; Westman, Champlin & Koehler, P.A.

(57) ABSTRACT

Wind farm comprising at least one buoyant structure having two corners provided with a wind turbine and a third corner comprising a mooring section, e.g., with a disconnectable mooring turret. The third corner does not carry one of the wind turbines. Shared facilities for the two wind turbines, such as a helideck and/or electrical equipment, such as a converter and/or transformer, can be located on or near the third corner.

17 Claims, 3 Drawing Sheets

(56) References Cited

OTHER PUBLICATIONS

Todd Woody: "Oregon's floating wind farm" www.cnmoney.com, Oct. 6, 2008, XP002557081, Retrieved from the Internet: URL:http://www.principlepowerinc.com/news/articles/fortuneOregonOffshore.pdf, figures.

SBM, IMODCO Inc.: Turret Mooring Systems Jan. 24, 2008, XP002580819 Retrieved from the Internet: URL:http://www.remet.pl/Turret_Mooring_Systems.pdf, figures.

Official Search Report and Written Opinion of the European Patent Office in counterpart foreign application No. PCT/EP2010/052152 filed Feb. 19, 2010.

* cited by examiner

OFFSHORE WIND PARK

CROSS-REFERENCE TO RELATED APPLICATION

This Application is a Section 371 National Stage Application of International Application No. PCT/EP2010/052152, filed Feb. 19, 2010 and published as WO 2010/094776 A1 on Aug. 26, 2010, in English.

BACKGROUND

The discussion below is merely provided for general background information and is not intended to be used as an aid in determining the scope of the claimed subject matter. Aspects of the invention relate to an offshore wind farm or wind park comprising two or more wind turbines. In this context, the expression offshore means any location on water, e.g., at sea, ocean or a lake, near shore or far offshore.

Offshore locations are particularly useful for wind parks, since higher wind energy yields can be obtained than on shore and there are less spatial restrictions. To build offshore wind parks, buoyant foundations can be used, such as the WindFloat® system of the US company Marine Innovation & Technology.

In offshore wind farms or wind parks, a minimum distance between the wind turbines is required to prevent that turbulence caused by a wind turbine would disturb the wind flow impinging an adjacent wind turbine. FIG. 1 shows diagrammatically the calculated wake effect of a 5 MW wind turbine with a rotor diameter of 115 meter. The distance between an upstream wind turbine and other wind turbines at its leeward side should be sufficient to keep the wind turbines outside the wake area of the upstream wind turbine, so as to avoid a fall of energy conversion efficiency and undesirable loads, which may cause accelerated deterioration of wind turbine components. FIG. 1 shows the wake area in case of an invariable wind direction. However, generally the wind direction varies. This results in an extended wake area and partial wake effects necessitating further spacing of neighboring wind turbines.

Wind turbines are generally provided with yaw systems allowing them to turn with the wind and to maintain an upwind or downwind orientation with every wind direction to maximize energy efficiency. The wake area turns with the yawing of the wind turbine. As a result, the distance between the wind turbines should be large enough in all directions.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An embodiment of a wind park includes at least one buoyant structure having two corners provided with a wind turbine and a third corner comprising a mooring section, wherein the third corner does not carry one of the wind turbines. This way, the turbulence caused by the wind turbines does not disturb the wind flow impacting neighboring wind turbines. The two wind turbines can stand much closer together than would be possible if a third front wind turbine would be present on the buoyant structure at a distance in front of the two turbines. For instance, the distance between the two wind turbines can be less than twice the diameter of the rotor blade area, e.g., about 1.5 times the diameter of the rotor blade area. Since the buoyant structure can be made much more compact, more wind turbines per surface area can be used and a compact wind farm with high turbine density can be realized. The distance between the mooring section and the wind turbines improves automatic alignment to the wind direction by weathervaning.

The wind turbines each comprise a rotor with one or more rotor blades defining plane of rotation. Interference by turbulence is minimized if the planes of rotation of the wind turbines are within the same plane. If one or more of the wind turbines comprises a yaw mechanism to yaw over a certain angular range, the wind turbines can be positioned in such way that the planes of rotation are within the same plane when the wind turbines are in the central yaw position.

While the rotor blades define a plane of rotation, it is not required that the blades have parallel straight longitudinal axes. The blades may wholly or partially be curved, twisted and/or coned relative to the hub, if so desired. However, in the overall impression the blades will define a plane of rotation.

The wind turbines can for example have a fixed orientation relative to the floating structure. In such case they do not need to have a yaw mechanism. Without yaw mechanism the wind turbine comprises less moving parts and requires less maintenance and repair. The buoyant structure can be rotated to position the wind turbines in an upwind or downwind position. Optionally, one or more of the wind turbines can have a yaw mechanism allowing limited yaw motion, e.g., yawing over a range of about 20 degrees, e.g., about 10 degrees, to enable correction when in case of misalignment between the wind direction and the sea current the wind turbines move out of the wind direction.

The structure can for example comprise a mooring section for mooring lines anchoring the floating structure to a sea bed. This mooring section can form a point of rotation. Turret mooring systems are particularly suitable. A turret mooring system is a mooring system where lines are connected to a turret which via bearings allows the buoyant structure to rotate around the anchor legs. Single-point mooring systems permit the buoyant structure to weathervane to the desired position.

Optionally, the structure may be provided with one or more drive units, e.g., one or more thrusters on one or more of the corners, for a more exact positioning of the buoyant structure. This can for example be desirable to compensate for current moving the floating wind turbines away from the optimum position relative to the wind.

In a further possible embodiment, the turret can be a disconnectable turret, e.g., comprising a submergible mooring buoy that can releasably be coupled to the turret. Examples of suitable disconnectable turret systems are the Riser Turret Mooring (RTM) system and the Buoyant Turret Mooring (BTM) system of SBM Imodco Inc. from Houston, Tex. The use of a disconnectable turret system for mooring a floating structure carrying one or more wind turbine has the advantage that the buoyant structure can be disconnected and transported to elsewhere, e.g., for maintenance or repair or for temporal storage elsewhere to save it from expected extreme weather conditions, such as hurricanes. After disconnection of the submergible mooring buoy, it can be kept floating below sea surface level to prevent impact of wave motion. The buoy may carry the connecting end of the power cables connecting the wind turbines to a grid.

The wind turbines will typically be of equal size, power, type and height. However, if so desired, different wind turbines can be used, e.g., wind turbines of different height.

The wind turbines on the buoyant structure are positioned in a row in parallel arrangement. Optionally a third, fourth or further wind turbine can be present in a row with the wind turbines on the two corners of the buoyant structure. The planes of rotation of all the wind turbines should preferably be within the same plane if the wind turbines have a fixed orientation relative to the buoyant structure. If they have a yaw mechanism allowing yawing over a limited angular range, the planes of rotation of all the wind turbines should preferably be within the same plane when the wind turbines are in the central yaw position.

To minimize the difference in speed between two passing blade tips of two adjacent wind turbines, the wind turbines can be configured to rotate in opposite directions. In such case, the wind turbines may for example have mirrored blade geometries or the rotor blades may have symmetrical rotor blade geometry. If more than two wind turbines are present, they may for example have alternating rotational directions. Alternatively, the wind turbines may be arranged to rotate in the same direction if so desired.

The corners carrying the wind turbines and the third corner with the mooring section form a triangular arrangement. This triangular configuration can for instance form an equilateral triangle. Alternatively, the distance between the mooring section and a wind turbine can be larger than the distance between the two wind turbines or the distance can be less, if so desired. Generally, the buoyant structure as a whole will have a triangular outline although other shapes can also be used if so desired.

The wind farm can for example comprise electrical equipment, such as a converter and/or transformer, shared by both wind turbines, the electrical equipment being located on or near the third corner, or a further free corner, of the buoyant structure. Other shared facilities can also be present on the buoyant structure, such as a helideck. A shared helideck has the advantage that with each flight two wind turbines can be serviced. The number of flights needed for maintenance of the wind turbines can substantially be reduced.

In a specific embodiment, the buoyant structure can have a center of gravity located at or above its center of buoyancy.

The structure can for instance comprise three vertical columns and connection elements each connecting two of the columns. The columns can for example be semi-submersible to stabilize it for the impact of wave motion. Optionally, the structure can have a submerged horizontal water entrapment plate attached to the lower end of each column, extending outwardly forming a section of a circle or a polygon around the base of each column, wherein the water entrapment plate area exceeds the cross-sectional area of the stabilizing column upon which it is attached, and wherein the water entrapment plate is supported by a plurality of radial beams each connected at one end to the base of the columns, and at the other end to the edges of the water entrapment plate, and transverse beams each connected at its both ends to the base of the columns and providing continuous support to the water entrapment plate.

Optionally, the buoyant structure comprises a deck attached to the upper ends of the columns, and/or it can be provided with walkways between the columns.

The wind turbines typically comprise a tower carrying a gondola or nacelle with a rotor hub carrying a rotor with at least one rotor blade. Wind force on the one or more blades induces rotation of the rotor which is linked, e.g., gearless or via a gear transmission, to a generator, which can for example be located in the nacelle.

The buoyant structure can comprise a buoyant substructure, a deck supporting minimum offshore facilities and/or an umbilical between the structure and possible subsea facilities beneath the buoyant structure. The substructure can comprise a plurality of vertical buoyant columns attached to a horizontal water entrapment plate at their lower end and to a deck that supports facilities at their upper end. The horizontal plate can extend radially from each column to cover the area formed by the center of the columns base. The buoyant structure can for example comprise further facilities such as antennas and other communication equipment to exchange information with a host platform, a helideck, storage and distribution systems, overnight accommodations for maintenance personnel, a crane or gantry to move equipment on the deck, a winch, or the like. The buoyant structure can be a column-stabilized unit with a large water-entrapment plate attached at the base of the columns. The submerged horizontal water entrapment plate can be designed to provide increased resistance to vertical accelerations and to roll and pitch rotational accelerations. Large amounts of water are displaced as the plate tends to move vertically. The mass of this displaced water is of the same order or larger than the mass of the buoyant structure. The total area of the plate is several times the cross-sectional area of the columns. The plate size and shape is adjusted so that it can compensate not only for heave, but also for strong wind force acting upon the carried wind turbines. This ensures that the motion of the buoyant structure remains small during normal operation. The plate can extend radially from each column forming a section of a polygon. The radial distance can be adjusted to control the natural roll and pitch period. The overall plate area is adjusted to control the heave natural period. In the section of the water-entrapment plate extending outward of the columns, no support to other parts of the hull is available near the plate outer edge, and therefore the water-entrapment plate must be cantilevered from the column. Because of the large hydrodynamic loads sustained by the water-entrapment plate, large structural supports are required to ensure the integrity of the plate and of its connection to the column. Such a buoyant structure is suitable to dampen wave and turbine motion, enabling wind turbines to be sited in previously inaccessible locations with strong winds. A suitable construction for a buoyant structure is for example disclosed in U.S. Pat. No. 7,281,881, hereby incorporated by reference.

BRIEF DESCRIPTION OF THE DRAWINGS

Aspects of the invention are further explained with reference to the accompanying drawing, in which.

DETAILED DESCRIPTION OF THE ILLUSTRATIVE EMBODIMENTS

Figure 1:
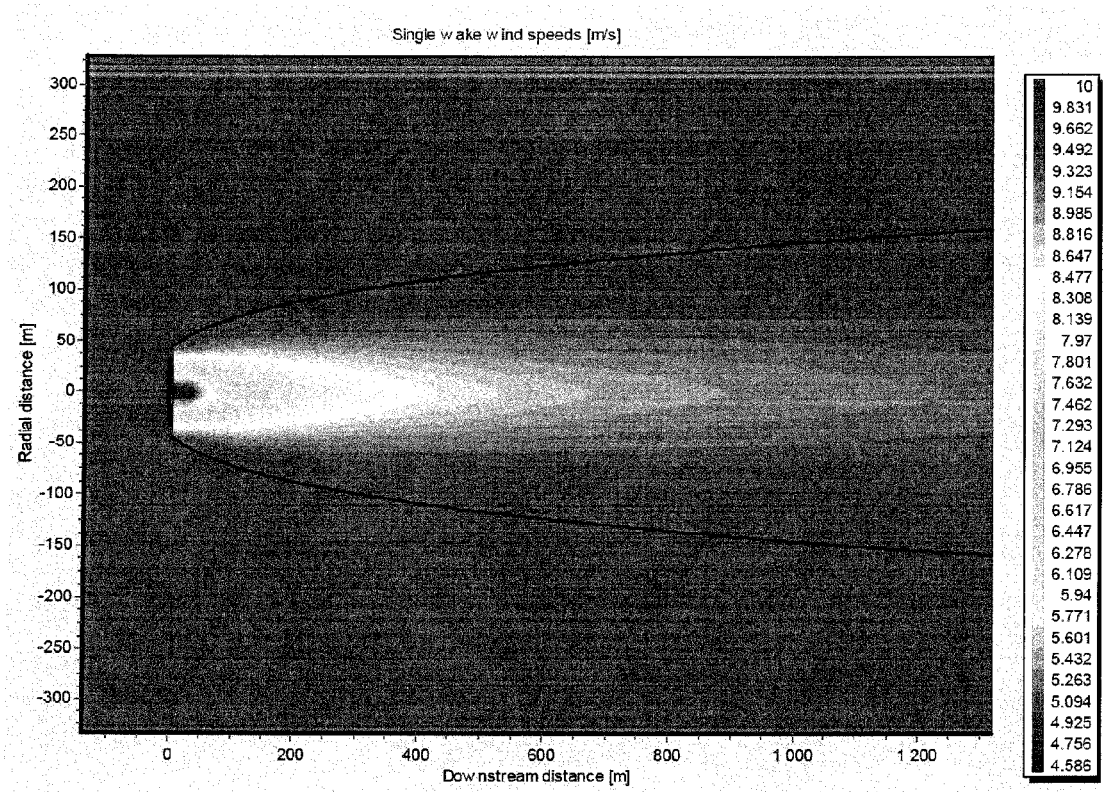
FIG. 1 shows diagrammatically the slipstream of a single wind turbine.
Figure 2:
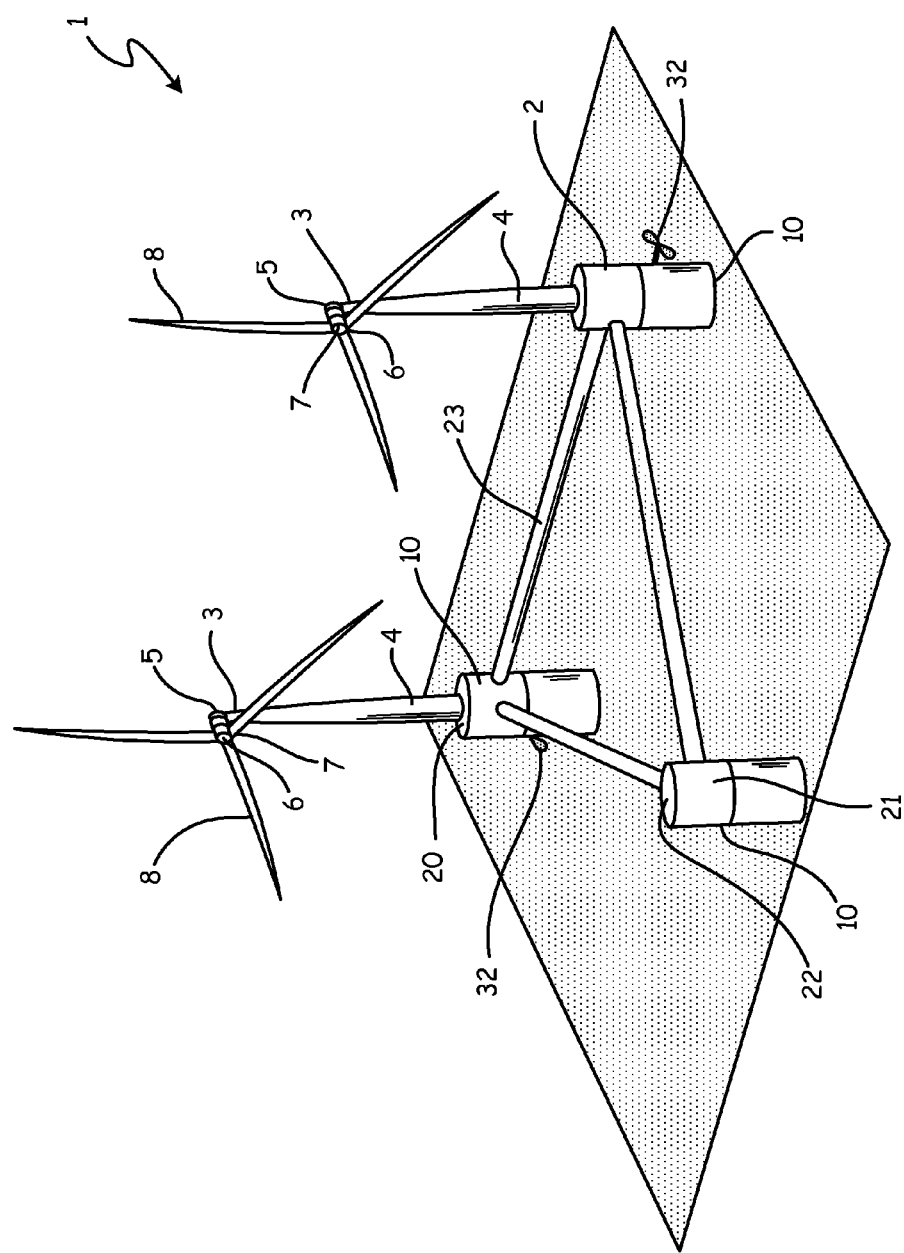
FIG. 2 shows in perspective a wind farm.

FIG. 2 shows a perspective view on an offshore wind farm 1. The wind farm 1 comprises a buoyant structure 2 carrying two wind turbines 3. The wind turbines 3 comprise a tower 4 carrying a gondola or nacelle 5 with a rotor 6 comprising a hub 7 carrying three rotor blades 8. Wind force impinging the rotor blades 7 induces rotation of the rotor 6 which is linked, e.g., gearless or via a gear transmission, to a generator located in the nacelle, converting the mechanical energy of the rotor into electrical energy, which is fed into a utility grid. The rotor blades 7 of each wind turbine 3 define a plane of rotation. As shown in FIG. 2, these planes of rotation of both wind turbines lay within the same plane. The wind turbines 3 have a fixed orientation relative to the buoyant structure 2 and do not have a yaw mechanism.

Figure 3:
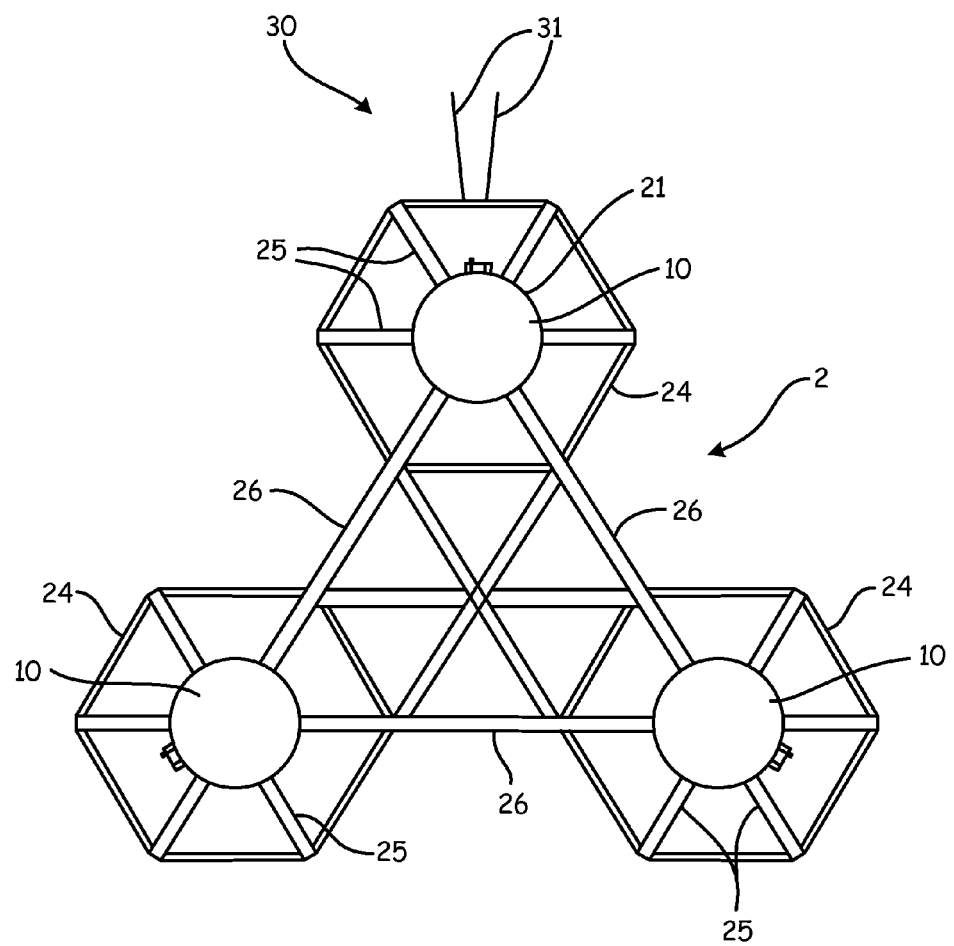
FIG. 3 shows a buoyant structure having water entrapment plates.

The buoyant structure 2 has a center of gravity located above its center of buoyancy. The structure 2 comprises three vertical columns 10 in a triangular arrangement. Attached to the lower end of each these columns 10 is a submerged horizontal water entrapment plate (FIG. 3) extending outwardly such as to form a section of a circle or a polygon around the base of each column 10. The water entrapment plate area exceeds the cross-sectional area of the stabilizing column 10 upon which it is attached. The water entrapment plate 24 is supported by a plurality of radial beams 25 each connected at one end to the base of the columns 10, and at the other end to the edges of the water entrapment plate 24, and transverse beams 26 each connected at its both ends to the base of the columns 10 and providing continuous support to the water entrapment plate 24.

The structure 2 can for example comprise a mooring section 30 having mooring lines 31 anchoring the floating structure 2 to a sea bed. This mooring section 30 can form a point of rotation. Turret mooring systems are particularly suitable. A turret mooring system is a mooring system where lines 31 are connected to a turret which via bearings allows the buoyant structure to rotate around the anchor legs. Single-point mooring systems permit the buoyant structure 2 to weathervane to the desired position.

Optionally, the structure 2 may be provided with one or more drive units 32 (FIG. 2), e.g., one or more thrusters on one or more of the corners, for a more exact positioning of the buoyant structure 2. This can for example be desirable to compensate for current moving the floating wind turbines away from the optimum position relative to the wind.

The three columns 10 form a triangle. The tops of the columns 10 form a deck 20. Two of these decks 20 carry a wind turbine 3. The deck 22 on the third corner 21 may carry shared facilities, such as a common converter or transformer used for both wind turbines and/or a shared helideck or the like (for example, deck 22). The deck 22 on the third corner 21 is also used as a mooring section with a turret (not shown) for attaching mooring lines 31 anchoring the floating structure 2 to the sea bed. The floating structure 2 can rotate around the third corner 21. Wind force will orient the buoyant structure 2 with the wind turbines 3 to an upwind orientation. The three columns 10 are linked by connection elements 23.

The invention claimed is:

1. A wind farm comprising at least one buoyant structure carrying a plurality of parallel wind turbines, all turbines of the plurality of turbines arranged only in a single row, the buoyant structure having a first semi-submersible corner and a second semi-submersible corner each provided with a wind turbine, and a third semi-submersible corner comprising a mooring section at a distance in front of the plurality of wind turbines, wherein the third semi-submersible corner does not carry any of the wind turbines.

2. The wind farm according to claim 1 wherein the wind turbines each comprise a rotor with one or more rotor blades defining plane of rotation, wherein the planes of rotation of the plurality of wind turbines are within the same plane.

3. The wind farm according to claim 1 wherein the distance between adjacent wind turbines of the plurality of wind turbines is less than twice the diameter of a rotor blade area, e.g., about 1.5 times the diameter of the rotor blade area.

4. The wind farm according to claim 1 wherein the buoyant structure is provided with one or more thrusters.

5. The wind farm according to claim 1 wherein the buoyant structure has a center of gravity located above its center of buoyancy.

6. The wind farm according to claim 1 wherein the buoyant structure comprises three semi-submersible vertical columns and connection elements each connecting to of the columns.

7. The wind farm according to claim 1 wherein the buoyant structure platform comprises three vertical columns and a submerged horizontal water entrapment plate attached to the lower end of each the columns extending outwardly such as to form a section around the base of each column, wherein the water entrapment plate area exceeds the cross-sectional area of the stabilizing column upon which it is attached, and wherein the water entrapment plate is supported by radial beams each connected at one end to the base of the columns, and at the other end to the edges of the water entrapment plate, and transverse beams each connected at its both ends to the base of the columns and providing continuous support to the water entrapment plate.

8. The wind farm according to claim 1 wherein the buoyant structure comprises shared facilities for the plurality of wind turbines, such as a helideck and/or electrical equipment, such as a converter and/or transformer, the shared facilities being located on or near the third semi-submersible corner.

9. The wind farm according to claim 1 wherein the plurality of wind turbines have a fixed orientation relative to the buoyant structure.

10. The wind farm according to claim 9 wherein the buoyant structure comprises a turret mooring system.

11. The wind farm according to claim 1 wherein each semi-submersible corner is connected to two other semi-submersible corners with elongated connection elements, and wherein the elongated connection elements and the semi-submersible corners form an aperture.

12. The wind farm according to claim 11 wherein a length of the elongated connection element between the semi-submersible corners supporting the plurality of wind turbines is greater than a diameter of each of the plurality of wind turbines.

13. The wind farm according to claim 12 wherein the semi-submersible corners and the elongated connection elements form a triangular structure.

14. A buoyant structure for a wind farm having a first semi-submersible corner and a second semi-submersible corner each provided with a wind turbine tower of a plurality of wind turbine towers, and a third semi-submersible corner comprising a mooring section at a distance in front of the plurality of wind turbine towers, wherein the third semi-submersible corner does not carry any of the plurality of wind turbine towers and the plurality of wind turbine towers are arranged across the buoyant structure only in a single row.

15. The buoyant structure of claim 14 wherein each semi-submersible corner is connected to the two other semi-submersible corners with elongated connection elements, and wherein the elongated connection elements and semi-submersible corners form an aperture.

16. The buoyant structure of claim 15 wherein a length of the elongated connection element between the semi-submersible corners supporting the wind turbine towers is configured to be greater than a diameter of a wind turbine mounted to each of the plurality of wind turbine towers.

17. The buoyant structure of claim 15 wherein the semi-submersible corners and the elongated connection elements form a triangular structure.

* * * * *